United States Patent [19]
Karr

[11] 4,217,720
[45] Aug. 19, 1980

[54] FISHING ROD HOLDER

[76] Inventor: Ralph G. Karr, 19905 Meadows Ct., Cerritos, Calif. 90701

[21] Appl. No.: 953,918

[22] Filed: Oct. 23, 1978

[51] Int. Cl.³ ............................................. A01K 97/12
[52] U.S. Cl. ...................................................... 43/17
[58] Field of Search ....................... 43/17, 16, 21.2, 15

[56] References Cited

U.S. PATENT DOCUMENTS

| | | | |
|---|---|---|---|
| 3,064,244 | 11/1962 | McCreary | 43/21.2 |
| 3,560,969 | 2/1971 | Fleeman | 43/21.2 |
| 3,874,107 | 4/1975 | Wheaton | 43/17 |

FOREIGN PATENT DOCUMENTS 2453690  5/1976  Fed. Rep. of Germany .............. 43/17

Primary Examiner—Nicholas P. Godici
Assistant Examiner—Roscoe V. Parker
Attorney, Agent, or Firm—Edgar W. Averill, Jr.

[57] ABSTRACT

A fishing rod holder for signaling the presence of a fish on the line of the rod. The rod handle is held by a holding tube attached to a support in such a way that it may pivot with respect to the support. A push button switch is mounted on the tube at an angle of between 110° and 140° with respect to the axis of the tube. An adjustable, switch-actuating member contacts the switch and may be adjusted to activate the switch over an angle of at least 20° movement of the tube. The actuating of the button activates a signal.

11 Claims, 4 Drawing Figures

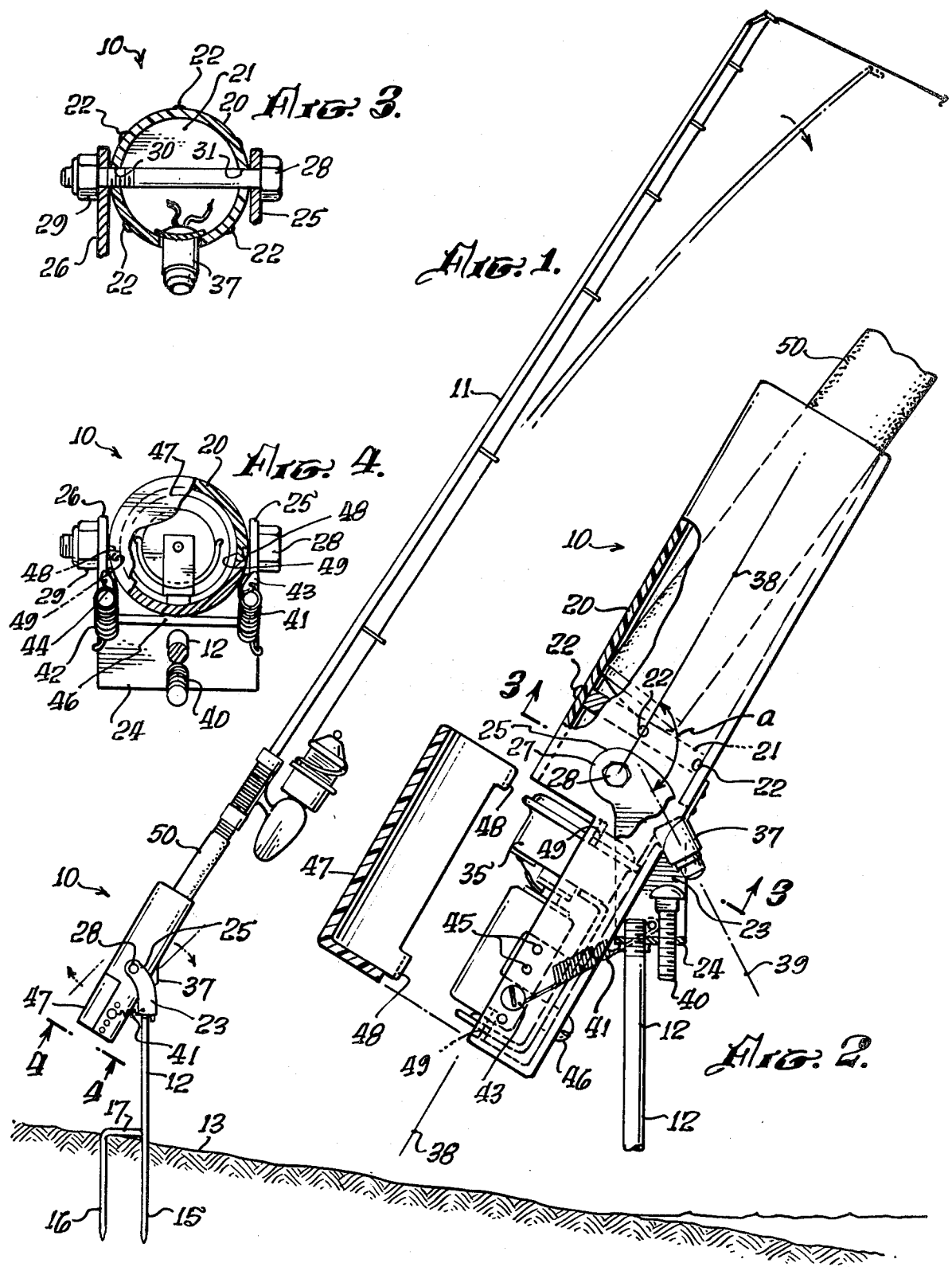

FISHING ROD HOLDER

BACKGROUND OF THE INVENTION

The field of the invention is fishing equipment and the invention relates more specifically to devices for holding fishing rods and sounding a horn or activating a light when a fish is hooked. Many of such devices have been patented including devices shown in the following U.S. Pat. Nos. 2,909,860; 3,156,997; 3,228,135; 3,560,969; 3,835,568; 3,862,508; 3,945,143; and 3,992,798.

The primary difficulty of the prior art fishing rod holding and signaling devices is the inability to be readily adjusted to poles of different weights and to pulls of various forces which are required to activate the signal. While most if not all of the prior art devices shown in the above-listed patents would be expected to be effective if properly adjusted for a particular fishing rod under certain conditions, none of the devices are believed capable of quick and accurate adjustment when a different fishing rod is used or the wind conditions or current conditions change drastically.

SUMMARY OF THE INVENTION

It is an object of the present invention to provide a fishing rod holding device which is capable of easy adjustment for different fishing rods and different conditions of wind, current and the like.

The present invention is for a fishing rod holder for signaling the presence of a fish on the line. The holder has a vertical support member to which a frame member is affixed. Holding means are held by the frame and support a holding tube in a manner which permits the tube to pivot with respect to the frame. The tube is supported at an angle from the vertical and has an upper and lower end. Fishing rod holding means are located at the upper end of the tube and biasing means urge the upper end of the tube in an upward direction. The tube is held at an angle of from between ten and 45 degrees with respect to the vertical when it is in its upwardmost position. The tube may be moved downwardly to an extent that an axis of the tube is at an angle of between 50 and 70 degrees with respect to the vertical support. A push button switch is attached to the tube at an angle of between 110 and 140 degrees with respect to the axis of the tube as measured from the upper end of the tube. An adjustable button-switch-actuating member is rigidly but adjustably affixed with respect to the frame member, said adjustable button-switch-actuating member being movable to a height so that the button switch is closed over an adjustable angle of at least 20 degrees. Signaling means are electrically connected to the button switch so that the signaling means are activated when the tube is moved downwardly.

BRIEF DESCRIPTION OF THE DRAWINGS

FIG. 1 is a side elevation of the fishing rod holder of the present invention having a fishing rod held thereby.

FIG. 2 is an enlarged cross-sectional side view of the holder of FIG. 1.

FIG. 3 is a cross-sectional view taken along line 3—3 of FIG. 2.

FIG. 4 is an end view partially cut away taken along line 4—4 of FIG. 1.

DESCRIPTION OF THE PREFERRED EMBODIMENTS

A fishing rod holder is indicated generally by reference character 10. Rod holder 10 is holding fishing rod 11 and the holder 10 has a vertical support member 12 which is stuck in the ground 13. The ground is, of course, near a body of water such as a lake, river, or ocean 14. The vertical support member 12 has a pair of spikes 15 and 16 which may be readily inserted by stepping on the horizontal portion 17 of spike 16.

Fishing rod 11 is held at an angle both with respect to the vertical and the horizontal. This angle helps to allow a maximum deflection of the rod in the event of a strike, and also helps to support the tip of the rod closer to the body of water 14, as compared to many of the prior art fishing rod holders which hold the rod in a vertical position.

The details of the fishing rod holder 10 are shown best in FIG. 2. The holder has a tubular body 20 which has an upper rod-holding chamber having a bottom plate 21 which is pinned to tubular body 20 by a plurality of pins 22. The tubular body is held to vertical support member 12 by a frame 23 which is threaded to support member 12. Frame 23 is generally U-shaped which is shown best in FIG. 4 and has a generally flat base member 24 and a pair of upwardly extending ears 25 and 26. Ears 25 and 26 have a protrusion indicated in FIG. 2 by reference character 27 which provides strength for bolt 28 which passes through tubular body 20 as shown best in FIG. 3. Bolt 28 is held to frame 23 by a lock nut 29. A pair of holes 30 and 31 pass through the wall of tubular body 20, and are sufficiently large so that the tubular body may freely pivot with respect to frame 23.

A signaling device such as a horn 35 is driven by a battery 36 which is activated by a switch 37. Switch 37 is mounted on an angle with respect to the axis 38 of the tubular body. The central axis 39 of swtich 37 should be mounted at an angle between 110 and 140 degrees with respect to the axis 38 of the body. This angle is indicated in FIG. 2 by reference character "a". Preferably, this angle is an important feature of the present invention and permits the holder to be adjusted to sound horn 35 over a large arc. If the switch were mounted perpendicularly with respect to the tube, the horn would be activated over a small arc and it would be very difficult to adjust the holder to provide an acceptible degree of sensitivity without false alarms. In this way, the user may readily adjust the holder depending upon the weight and length of the rod, the wind, the river current, size of fish and other variables so that the device does not sound a false alarm and yet is sufficiently sensitive so that any strike activates the alarm.

Switch 37 is actuated by contact with bolt 40 which is threaded into the base 24 of frame 23. The height of the bolt 40 with respect to the base 24 determines the angle at which the horn is sounded. The holder of the present device is capable of being adjusted to sound the horn over an angle of about 30 degrees which permits a very wide adjustment for the particular conditions used.

A further adjustment is possible by the positioning of springs 41 and 42 which provide biasing between tubular body 20 and frame 23. Spring 41 is held at one end by an opening in ear 25 and at its other end by a screw 43 which is threaded into the wall of tubular body 20. A second screw 44 is likewise threaded into the other side of tubular body 20. A plurality of threaded holes 45 are tapped in each side of tubular body 20 and the selection of the hole gives a coarse adjustment for the weight of the rod to be used. The fine adjustment is provided by bolt 40.

The fishing rod handle 50 rests in the chamber formed by the upper part of tubular body 20, and bottom plate 21. This holding is conventional and very convenient for removing of the rod in the event of a strike. The battery and horn are positioned in the lower portion of tubular body 20 and held thereto by screw 46. The positioning of the battery near the lower end of tubular body 20 helps to provide a counter weight for rod 11. A removable cover 47 is resiliently held by four downwardly depending fingers, two of which are indicated by reference character 48. Fingers 48 snap into depressions 49 formed in the inner surface of tubular body 20.

When the holder is in its maximum upward position, the axis is at an angle of from about 10 to 45 degrees from the vertical. An angle of about 30 degrees is preferred to provide sufficient separation between the rod tip and the holder. This helps avoid snags in the event of slack in the line.

While the invention has been described as having a vertical support member 12, it is, of course, possible that the support member 12 would be inserted at an angle other than vertical, but the term "vertical" is used with the intent of clarifying the description of the invention. While the body 20 has been referred to as "tubular" it could, of course, have a square or rectangular cross-section or could be elliptical, oval or the like. Likewise, while the biasing means have been shown as coiled springs, they could instead be leaf springs, helical torsional or the like.

While the holder is designed to move through a relatively wide angle to permit an additional amount of play to any fish on the line, the downward movement of the tubular body should not exceed 70 degrees so that the rod will be held securely by the upper chamber of the body. A maximum downward movement of between 50 and 70 degrees is appropriate with about 60 degrees being preferred.

While the holder of the present device as shown in the drawings utilizes a horn, it is likewise possible to utilize a light or other signaling device. Alternatively, a combination of horn and light could be used.

The rod holder of the present invention is also particularly easy to adjust because of the visible downward movement when the rod is placed in the holder. Most prior art devices either are very difficult to adjust or do not have the same sensitivity of applicant's device which sensitivity results from the fine adjustment possible by the visual movement of the holder during adjustment. The movement of the holder with the wind or tide indicates the great sensitivity of the device, and yet the bolt 40 may be lowered to a position so that the horn 35 is not activated until there is an additional pull on the line caused by the hooking of the fish.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A fishing rod holder for signaling the presence of a fish on the line of the rod, said holder comprising:
    a vertical support member;
    a frame member affixed to said support member;
    holding means held by said frame member;
    a fishing rod holding tube attached to said holding means, said tube having a fishing rod holding means at its upper end and being equipped with biasing means urging the upper end of said tube in an upward direction, said tube being affixed to said holding means so that the axis of the tube is at an angle of between 10 and 45 degrees with respect to said vertical support member when said tube is in its maximum upward position, said tube being further affixed to said holding means so that its upper end may move to a downward position so that the axis of the tube is at an angle of between 50 degrees and 70 degrees with respect to the vertical support member;
    a push-button switch attached to said tube at an angle of between 110 and 140 degrees with respect to the axis of the tube as measured from the upper end of the tube;
    an adjustable button-switch-actuating member rigidly but adjustably affixed with respect to said frame member, said adjustable button switch activating member being movable through a range of heights so that said button switch is closed over an adjustable angle of at least 20 degrees; and
    signaling means electrically connected to said push-button switch whereby said signaling means is activated when said tube is moved downwardly.

2. The holder of claim 1 wherein said frame member is "U" shaped having a generally flat base member having two upwardly extending ears.

3. The holder of claim 2 wherein said actuating member is affixed to said generally flat base member.

4. The holder of claim 2 wherein said holding means comprises a pin held by said ears and passing through said tube.

5. The holder of claim 1 wherein said fishing rod holding means comprises a cylindrical chamber located in the upper end of said tube.

6. The holder of claim 1 wherein said tube is held at an angle of about 30 degrees with respect to the vertical support member when said tube is in its maximum upward position.

7. The holder of claim 1 wherein said adjustable angle is about 30 degrees.

8. The holder of claim 1 wherein said signaling means is a horn and battery held within the tube near the lower end thereof.

9. The holder of claim 1 wherein said push-button switch is mounted at an angle of about 120 degrees with respect to the axis of the tube.

10. The holder of claim 2 wherein said biasing means comprises a pair of coil springs affixed to the ears of said "U" shaped frame, each of said springs being affixed at their other ends to the sides of said tube near the lower end thereof.

11. The holder of claim 10 wherein there are a plurality of attachment points for the lower ends of the springs.

* * * * *